United States Patent [19]

Ulland et al.

[11] 4,065,708

[45] Dec. 27, 1977

[54] METHOD AND APPARATUS FOR DETERMINING STEPPING MOTOR PARAMETERS FROM INDUCED VOLTAGES

[75] Inventors: Hartmut Ulland, Sindelfingen; Volker Zimmermann, Schoenaich; Rainer Zuehlke, Warmbronn, all of Germany

[73] Assignee: International Business Machines Corporation, Armonk, N.Y.

[21] Appl. No.: 620,097

[22] Filed: Oct. 6, 1975

[30] Foreign Application Priority Data

Oct. 5, 1974 Germany .............................. 2447673

[51] Int. Cl.² .......................................... H02K 29/02
[52] U.S. Cl. .................................... 318/685; 318/696; 310/49 R
[58] Field of Search ............... 318/685, 696, 254, 138, 318/439, 327; 310/49

[56] References Cited

U.S. PATENT DOCUMENTS

| | | | |
|---|---|---|---|
| 3,250,977 | 5/1966 | Heggen | 318/685 X |
| 3,374,410 | 3/1968 | Cronquist et al. | 318/685 |
| 3,548,274 | 12/1970 | Mako | 318/685 X |

*Primary Examiner*—Herman J. Hohauser
*Attorney, Agent, or Firm*—Kenneth W. Hairston; M. H. Klitzman; J. Jancin, Jr.

[57] ABSTRACT

An improved method and apparatus for determining the speed and position values of a stepping motor for controlling or regulating the same. These values are derived from induced voltages within the bifilar windings of the stepping motor combined with voltages across and currents through the same bifilar windings. The speed values are derived from the amplitude of the induced voltages and the position values are derived from the zero transitions of the induced voltages. A desirable advance of the motor is distinguished from an undesirable oscillation of the motor by determining whether the induced voltages in the bifilar windings become zero simultaneously.

8 Claims, 12 Drawing Figures

METHOD AND APPARATUS FOR DETERMINING STEPPING MOTOR PARAMETERS FROM INDUCED VOLTAGES

BACKGROUND OF THE INVENTION

1. Field of the Invention

This invention relates to stepping motors, and more particularly to a method and apparatus for determining the speed and position values of such motors.

2. Description of the Prior Art

The stepping motor is increasingly used for applications calling for the motor to be operated quasi-continuously, because of its relatively simple digital control. The open loop mode and the feed-back mode are two operating modes for applications where the stepping motor is operated quasi-continuously. The open loop mode is highly susceptible to oscillations and the feed-back mode necessitates a feed-back signal indicating the respective operational stage of the motor shaft. Optically coded disc, attached to the motor shaft, provide this feed-back signal, by emitting one pulse for each motor step. To ensure that this pulse is accurate within a few percent of the step width, the discs pattern and the adjustment of the axle must meet very stringent requirements. An increase in the degree of accuracy of the disc is possible by using larger discs, but that would mean an increase in the rotational mass of the motor. The protection needed against contamination, the light source, and the light detector required render this method very expensive.

With each pulse a coded disc of the kind described provides information on the position of the motor shaft. Information on the speed can be obtained only as a function of the time difference between two feed-back pulses. Whenever this method is employed the speed during a step just completed can only be determined afterwards. This is a serious disadvantage when the motor moves very slowly shortly before it reaches its stand-still position. In other words, instantaneous speed data is not available.

Where a stepping motor is used to control the operational sequence the greatest problem is to accurately control the motor into its end position.

SUMMARY OF THE INVENTION

It is a principle object of the present invention to determine the speed and position values of a stepping motor arranged for quasi-continuous, feed-back operation by an improved measuring circuit.

A more particular object of the present invention is to eliminate optically coded discs and the problems of adjustment and contamination associated therewith.

Yet another object of the present invention is to obtain instantaneous speed data from a stepping motor.

It is also an object of the present invention to detect undesirable oscillations of the stepping motor in its controlled end position.

To eliminate the above-mentioned disadvantages, a method is provided whereby the speed and position values are derived from induced voltages on the bifilar windings of the stepping motor. The speed values are derived from the amplitude of the induced voltages and the position values are derived from the zero transitions of the induced voltages.

A circuit for carrying out the invention is provided with an amplifier for measuring the voltage across a bifilar winding pair and an amplifier for measuring the currents passing the two paths of the said bifilar winding pair. The output signals of the two amplifiers are then fed to an operational amplifier where they are combined. A peak value rectifier supplying an output signal proportional to the speed values and a zero detector supplying the position values are connected to the output of this operational amplifier.

The foregoing and other objects, features and advantages of the invention will be apparent from the following more particular description of the preferred embodiment of the invention, as illustrated in the accompanying drawings.

DESCRIPTION OF THE PREFERRED EMBODIMENT

Figure 1:
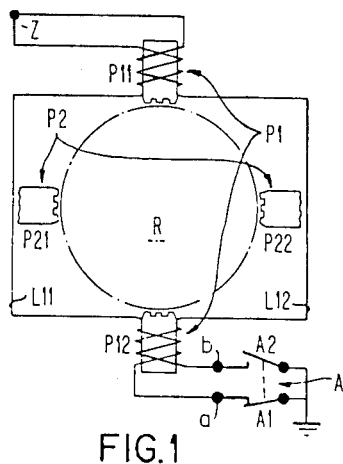
FIG. 1 is a schematic representation of a stepping motor with two bifilar stator winding pairs.

Referring now to FIG. 1, there is shown a schematic representation of a stepping motor with two bifilar stator winding pairs. Rotor R consists of a permanent magnet with soft iron pole shoes (shoes not shown because well known in the art). The stator also consists of soft iron poles which are excited by windings P1 and P2. The embodiment concerns a stepping motor whose stator is made up of two physically staggered bifilar coil pairs (P1 and P2). The advance movement is initiated by alternately setting pulses on these coils by means of switch A (consisting of subswitches A1 and A2) and by the mutual effect of the stator and the rotor magnetic field. In FIG. 1 the first pole pair is designated as P1 and the second pole pair as P2. Poles P11 and P12 of pole pair P1 carry bifilar windings L11 and L12, respectively. The top ends of windings L11 and L12 are connected at point Z. The supply voltage Vs is applied to point Z. (For clarity's sake the windings and lines as well as the corresponding switch for the second pole pair P2 are not shown in FIG. 1, since in principle they would be arranged in the same manner as the corresponding elements of pole pair P1).

Figures 2A, 2B, 2C:
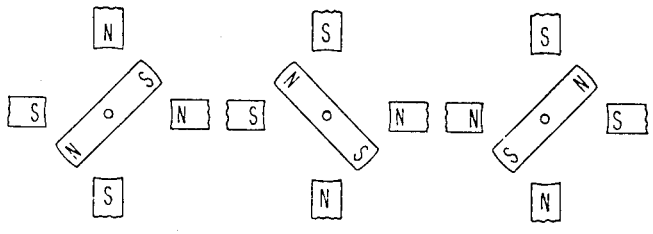
FIG. 2 is a schematic representation of the stepping movement illustrated by means of the operational states 2a, 2b, and 2c.

FIGS. 2a, 2b, and 2c schematically represent the step-by-step advance for two pole pairs P1 and P2. The poles are marked N (for north pole) and S (for south pole). Assuming the stator poles are excited as shown in FIG. 2a, then the rotor adopts the illustrated position. When the direction of the current of pole pair P1 is reversed, this being effected by the excitation of the other partial winding of the bifilar winding pair, the rotor assumes a new stable position, as shown in FIG. 2b. Thus, the motor has completed one step. Then the poles of pole pair P2 are reversed, and the rotor moves into another stable position (FIG. 2c).

In practice the number of stator pole pairs is considerably larger. In addition, the rotor and the stator are frequently provided with "pole teeth" (FIG. 3), which ensure a more accurate setting of the stepping angle. For a tooth number of 36 on the rotor and for four stator pole pairs the number of steps is $36 \times 4 = 144$ per revolution.

Figure 4:
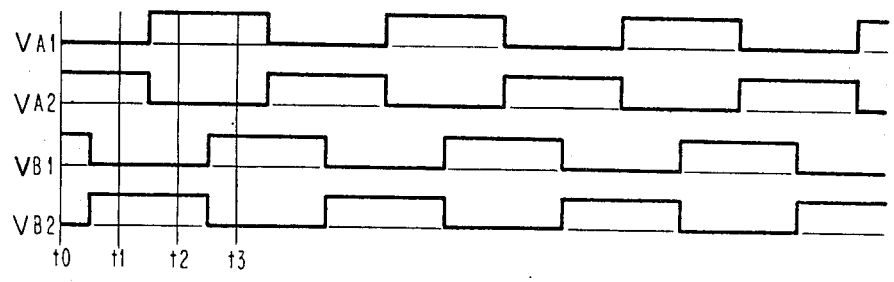
FIG. 4 is a timing diagram showing the control voltages for switches A (A1 and A2) of pole pair P1 and switches B (B1 and B2) of pole pair P2.

As previously mentioned, the rotor is advanced by reversing the poles of one pole pair; subsequently, the other winding of the bifilar winding pair is excited (commutation) by means of one of the subswitches A1 or A2. Assuming the switches are semiconductor switches and that one switch gates in response to a positive input voltage signal, then FIG. 4 shows in which sequence the switches have to be controlled in order to advance the rotor. The three states 2A to 2C in FIG. 2 can be identified, for example, by means of the times $t1$ to $t3$ indicated in FIG. 4.

The step-by-step advance will be described in detail below by means of the diagram of FIG. 4 showing how stepping pulses are applied to the stator pole windings of the stepping motor. VA1 and VA2 are the control voltages for subswitches A1 and A2 (FIG. 1) of pole pair P1 and VB1 and VB2 are the control voltages for subswitches B1 and B2 (not shown) of pole pair P2. The two pulse sequences VA1 and VB2, respectively, are time staggered in relation to each other by the duration of one step.

In FIG. 2A (time $t1$ in FIG. 4) the left pole of the horizontal pole pair P2 is S poled, so that the N pole of the rotor and the S pole can attract each other. The upper pole of the vertical pole pair P1 is S poled in FIG. 2B (time $t2$ in FIG. 4), in order that the N pole of the rotor and the S pole of the vertical pole pair will attract each other. In FIG. 2C (time $t3$ in FIG. 4) the right pole of the pole pair P2 is S poled, in order that the N pole of the rotor will again be attracted by a S pole.

Figure 3:
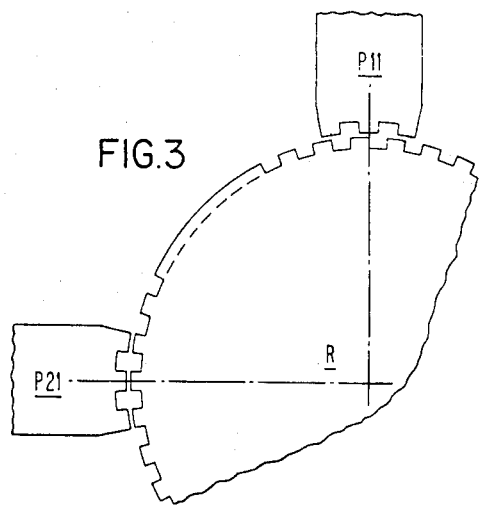
FIG. 3 is a schematic representation of the stepping movement of the stepping motor.

Referring to FIG. 3, if VA1 = 0 and VB1 = 0 at a time $t1$ and the pole pitches of rotor R and the stator pole P21 are roughly facing each other, then the pole pitches of rotor R in comparison to stator pole P11 are staggered in relation to each other by one quarter of the pitch value. Also assuming VA1>0 and VB1 = 0 at time $t2$, then the pole reversal commutation on pole pair P1 would cause the pole elements of the rotor and stator facing each other in a staggered position at the time $t1$ to be "pulled into" alignment with each other. This in turn would lead to the rotor being moved by one quarter of the pitch value, according to the subdivision of the rotor into 36 pole teeth.

This process of the rotor being pulled by half a tooth space into the direction of the stator pole during a pole reversal is referred to as a step. In the arrangement shown in FIG. 1, the pole "teeth" of the rotor and stator pole P21 will again face each other in alignment after the fourth pole reversal. But in comparison with the time to the rotor will have moved on by four times one half of a tooth space (equalling one pole pitch).

Figure 5:
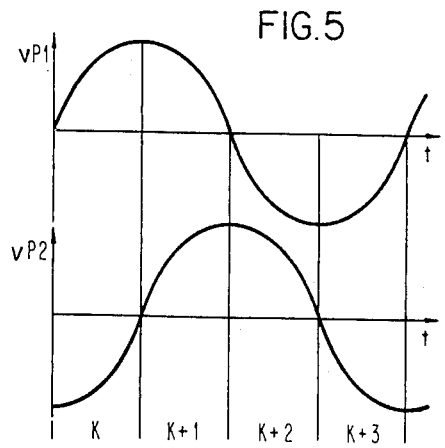
FIG. 5 is a timing diagram showing the voltages induced into the stator winding pairs associated in time with the steps.

Referring now to FIG. 1, when the permanently magnetic rotor R is moved past the stator windings L11 and L12 voltages are induced into the latter. Partial voltages of the same magnitude are induced into the two-partial windings L11, L12, L21, and L22, respectively. These partial voltages add up as a result of the winding arrangement shown in FIG. 1. The sum of the two partial voltages induced into pole pair P1 in FIG. 5 is referred to as vP1, whereas that of pole pair P2 is referred to as vP2. The induced voltage for pole pair P1 occurs between terminals $a$ and $b$ (FIG. 1). For pole pair P1 and pole pair P2 the voltage curve covering four steps (K, K+1, K+2, K+3) is shown in FIG. 5. As a result of the arrangement of pole pairs P1 and P2 the voltage flows of vP1 and P2 are phase shifted in relation to each other, in this specific case by one step. Voltages vP1 and vP2 are hereinafter referred to as induced voltages. For the stationary mode of the stepping motor its rotor induces the voltage $vP1 = v(s) \cdot \sin x$ into the windings L11 and L12 of pole pair P1 and the induced voltage $vP2 = v(s) \cdot \cos x$ into the windings L21 and L22 of pole pair P2. (The $x$, in sin $x$ and cos $x$, refers to a position coordinate, whereby a "full" sinusoid corresponds to the distance between one pole tooth and another).

The position dependent modulation sin $x$ and cos $x$, respectively, permit the step positions to be accurately determined as a function of zero transistions of the voltage during one motor revolution. Therefore, the various motor tolerances (e.g., in the step indexing) are taken into account. Motor tolerances with respect to step indexing may occur, for example, if n number of poles are not positioned with 100 percent accuracy at the points determined by dividing 360° by $n$. The voltage $v(s)$ is directly proportional to the current speed and is readily measurable for sin $x = 1$ and cos $x = 1$, respectively. This applies in particular when the induced voltage vP1 is measured at the time when the induced voltage vP2 passes through zero and vice versa. (If induced voltage vP2 passes through zero, the induced voltage $vP1 = v(s) \cdot 1$).

Figure 6:
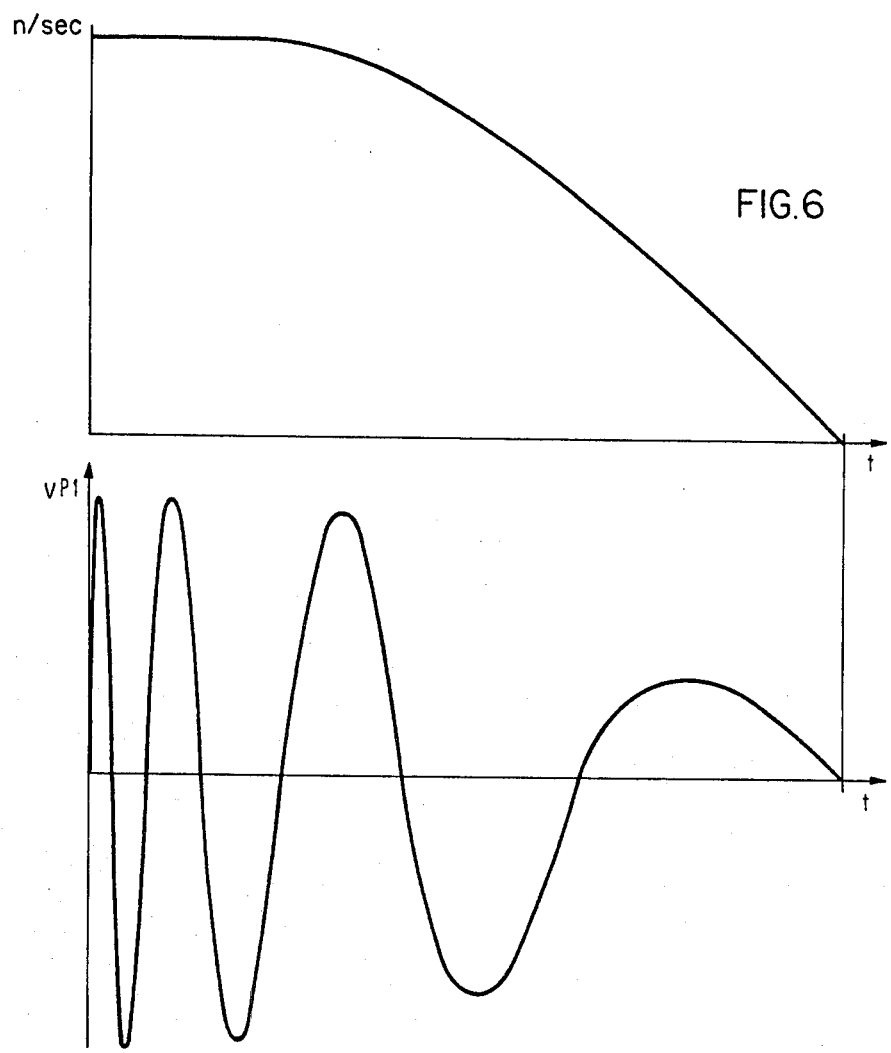
FIG. 6 is a timing diagram $n/\text{sec.} = f(t)$ showing continuous control of the stepping motor into an end position associated in time with a diagram $vP1 = f(t)$ representing the voltage induced into a stator winding pair.

FIG. 6 shows the curve of the stepping frequency n/sec during the deceleration of the motor as a function of the time $t$ and associated in time with the induced voltage vP1 occurring in pole pair P1.

Analogously to FIG. 5, it can be said that the motor performs two steps between two zero transitions of voltage vP1.

Figure 7:
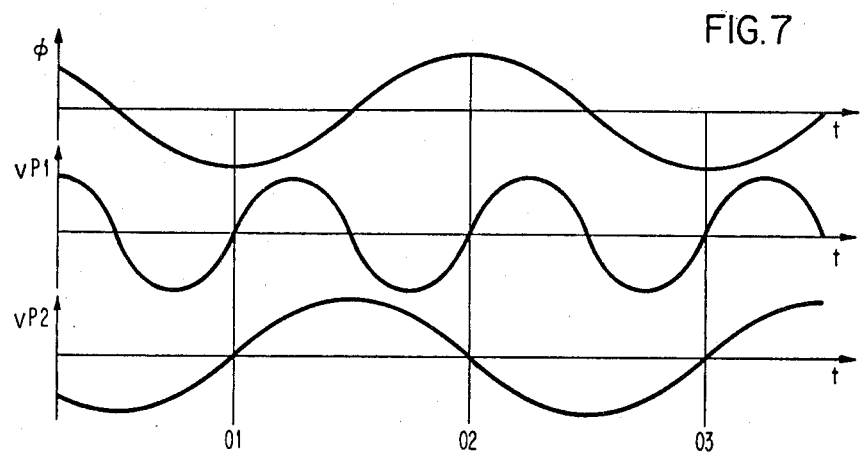
FIG. 7 is a timing diagram representing the voltages induced into the stator winding pairs associated in time with the final oscillation of the stepping motor in a controlled end position.

In an ideal case the stepping motor reaches its end position at a speed of zero (FIG. 6). However, the motor has a minimum speed when reaching its end position, so that it slightly "overshoots its goal", coming to a standstill as its oscillation decays (as shown in the top part of FIG. 7). In this figure, position $\phi$ is represented as a function of the time $t$. When the motor oscillates, it comes to a short standstill in the reversal points when the motor speed is zero, so that the induced voltages vP1 and vP2 are zero at these times. In other words, as the motor oscillates both induced voltages disappear simultaneously for the reversal points. With regard to the control of the stepping motor, it is thus possible to distinguish between (a an undesirable oscillation about the end point and (b) an actual still desirable advance. In (a), as previously described, the two induced voltages vP1 and vP2 become simultaneously zero (FIG. 7). This does not apply to an actual still desirable advance. In (b), the zero positions of the induced voltages vP1 and vP2 follow each other at a one step delay (FIG. 5).

Figure 8:
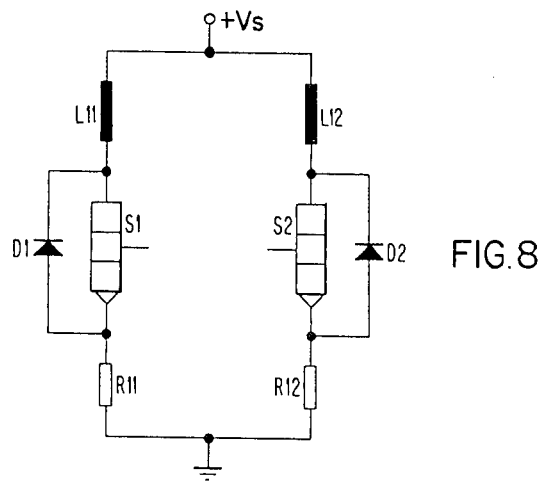
FIG. 8 is one type of circuit for a bifilar stator winding pair of FIG. 1.
Figure 9:
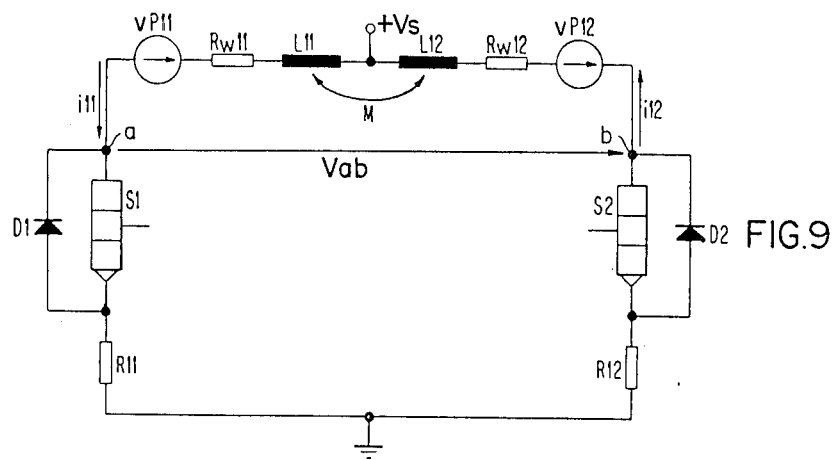
FIG. 9 is an equivalent circuit diagram of a stepping motor with a bifilar stator winding pair as in FIG. 8.

The same induced voltage values previously determined will now be derived from equivalent circuits shown in FIGS. 8 and 9. FIG. 8 is a typical wiring diagram of a stepping motor with a bifilar winding. In FIG. 8 (as in FIG. 1) Vs is the supply voltage, L11 and L12 are equivalently shown as inductances of the bifilarly wound pole pair P1, and D1 and D2 are the commutating diodes which serve to protect the semiconductor switches S1 and S2. S1 and S2 are assumed to be electronic switches whose function corresponds to that of switch A (with the subswitches A1 and A2 in FIG. 1). R11 and R12 are assumed to be measuring resistors of the same magnitude. An equivalent circuit diagram for a stepping motor circuit with a symmetrical bifilar stator winding pair is shown in FIG. 9, where L11 and L12 are ideal inductances, M is the mutual inductivity, and Rw11 and Rw12 are the winding resistors of one of the two coil pairs. Induced voltages vP11 and vP12 are taken into account as active voltage sources. The designation of the remaining elements of the equivalent circuit diagram corresponds to that of FIG. 8. The equivalent circuit diagram comprises a left and a right path passed by the currents i11 and i12, respectively. In this equivalent circuit diagram a measurable voltage Vab occurs between terminals a and b. This voltage is also measurable in the realized circuit between the terminals (FIG. 10) designated by the same characters as those in the equivalent circuit diagram. According to Kirchhoff's mesh rule, the following applies to the equivalent circuit diagram of the stepping motor:

$$vP11 + vP12 = Vab + R211.i11 + L11\, di11/dt + Rw12.i12 + L12\, di12/dt + M\,(di11/dt + di12/dt)$$

Because of the close coupling of the two individual windings (bifilar winding) and for reasons of symmetry the following holds:

$$L11 = L12 = M.$$

Where L1 is inserted for all of these values and $$vP1 = vP11 + vP12 \text{ and } Rw1 = Rw11 + Rw12$$

then $$vP1 = Vab + Rw1(i11 + i12) + 2L1\, d/dt\,(i11 + i12)$$

is obtained.

Further simplified this relation is $$vP1 = Vab + K1\,(i11 + i12) + K2\, d/dt\,(i11 + i12) \quad (1)$$

where vP1 = induced voltage
Vab = measurable voltage across terminals a and b of a pole pair,
i11 and i12 = measurable currents through the pole pair coils, and
K1 and K2 = fixed motor parameters (coefficients).

Thus, a relation is obtained, by means of which the induced voltage vP, can be determined on the basis of a differential equation with the measurable current values i11 and i12 and a measurable voltage rate by combining the latter with motor parameters. As will hereinafter be fully explained in FIG. 10, the induced voltage vP, can be determined directly by measuring the voltages across the bifilar windings. This permits one to determine the induced voltage and also deduce the speed and position values of the motor from the induced voltage. The amplitude and the zero transitions of the induced voltage are indicative of the speed and the position values of the stepping motor, respectively.

Figure 10:
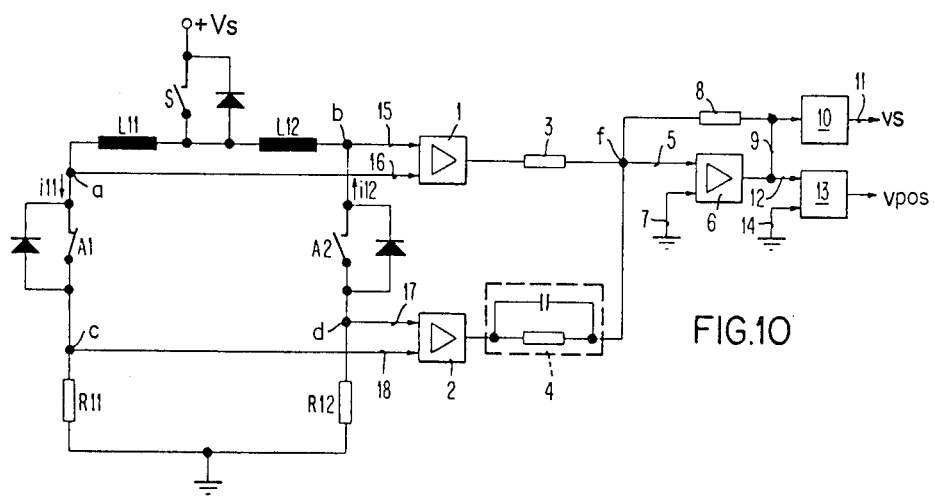
FIG. 10 is a circuit for determining the speed and position values of a stepping motor.

FIG. 10 shows a circuit for determining the speed and position values of a stepping motor. The description concerns the bifilar windings of pole pair L11 and L12 (recognizing that the description would be equally applicable to the windings not shown). Each path of this pole pair is passed by the currents i11 and i12, respectively.

The upper ends of the inductances L11 and L12 are connected to the supply voltage +Vs via switch S at their common linkage point. (Even though switch S is not shown in FIG. 1, it is intended that one would exist). The diode connected parallel to switch S serves to protect semiconductor switch S.

Terminals a and b for measuring a voltage are arranged on the lower ends of the two inductances L11 and L12. The function of the subswitches A1 and A2 corresponds to the function of subswitches A1 and A2 in FIG. 1.

The inductances L11 and L12 together with switches A1 and A2 are alternately grounded via measuring resistors R11 and R12. This circuit is used to ensure a high torque over a wide revolutional range. The duty cycle on switch S is such that the peak value of the motor flux is constant. The voltage applied across coils L11 and L12 (Vab in equation 1) is measured between points a and b. From these points, connector lines 15 and 16 lead to the inputs of a differential amplifier 1. From terminals c and d connectors 17 and 18 lead to the inputs of a differential amplifier 2 which serves to measure the sum of the currents in accordance with equation 1. Via a resistor 3 the output of differential amplifier 1 is connected to summation point f of an operational amplifier 6.

Via an RC combination 4 the output of differential amplifier 2 is also connected to terminal f. This RC combination is dimensioned as a function of motor parameters. Assuming the output of differential amplifier 2 carries an output signal k (i11 + i12) where k is the coefficient, then the resistor of the RC combination 4 would have to be k/Rw1. R and the capacitor 2L1/R.k. In these relations R is the resistor 3 and the resistor 8,
Rw1 is the line resistance of a pole pair winding, and
2L1 is the inductance of a pole pair winding.

From terminal f a line 5 leads to the input of an operational amplifier 6. The output voltage of the operational amplifier corresponds to the induced voltage values of the motor. A second input of operational amplifier 6 is connected to ground via line 7. Via resistor 8 the output of operational amplifier 6 is linked to terminal f. This connection serves as a feed-back for the operational amplifier. Together with the other circuit elements this operational amplifier forms the equation 1 combining the induced voltage and the measured voltage and current values, taking into accound fixed motor parameters. Via line 9 the output of operational amplifier 6 is connected to a peak value rectifier 10. On its output line 11 this peak value rectifier 10 supplies an output signal v(s) which is proportional to the speed values of the stepping motor. Via line 12 the output of the operational amplifier is also linked to a circuit 13 which serves to determine the zero transitions of the output voltage of operational amplifier 6.

The zero transitions can be determined by circuit 13 comparing the output voltage of operational amplifier 6 with a zero voltage. A reference potential as a second input is connected to circuit 13 via line 14. When the input values of circuit 13 are equal, circuit 13 (zero detector) emits a pulse-type output signal and subsequently upon the occurrence of a second zero transition emits another pulse-type output signal. The sequence of these signals Vpos indicates the position of the stepping motor. Thus, signals corresponding to the motor position values are obtained from this zero detector 13. A circuit in accordance with FIG. 10 is for only one winding pair, therefore, it only emits zero signals for every other step. If information was required on every step the circuit would have to be provided for each winding pair. In such a case the position pulse on the output of the circuit, for the second winding pair, would be phase-shifted by one step as in FIG. 5.

The speed and position values determined in accordance with this invention can be used to control a stepping motor in substantially the same manner as speed and position values are used in a patent application entitled, "Method of Controlling a Stepper Motor," Ser. No. 572,593, filed Apr. 28, 1975, by Bastian Bechtle, et al., and assigned to the assignee of the present application.

While the invention has been particularly shown and described with reference to a preferred embodiment thereof, it will be understood by those skilled in the art that changes in form and details may be made therein without departing from the spirit and scope of the invention.

What is claimed is:

1. In combination with an electrical stepping motor having at least two bifilar winding pairs, means for determining speed and position values of said stepping motor comprising:
    amplifying means for receiving induced voltages within the said bifilar windings of the said stepping motor in addition to applied voltages across and currents through the said bifilar windings;
    rectifier means responsive to said induced voltages for providing an output signal proportional to the instantaneous speed values of the said stepping motor; and
    detector means responsive to said induced voltages for providing an output signal indicative of the position of the said stepping motor.

2. The apparatus defined in claim 1 wherein said amplifying means for receiving current and voltage values from the bifilar windings comprises:
    two differential amplifiers joined to said bifilar winding pairs for receiving the said current and voltage values from said stepping motor; and
    an operational amplifier connected to the outputs of said two differential amplifiers for providing an output voltage which corresponds to the said induced voltages of said stepping motor.

3. The apparatus in claim 1 wherein said rectifier means for providing an output signal proportional to the instantaneous speed values of the said stepping motor is a peak-value rectifier connected to the output of said operational amplifier.

4. The apparatus defined in claim 1 wherein said detector means for providing an output signal indicative of the position of the said stepping motor is comprised of a zero detector which determines the position of the stepping motor by the zero transitions of the output voltage of the said operational amplifier.

5. The apparatus defined in claim 2 wherein one of said two differential amplifiers measures the voltage across the said bifilar winding pairs, and the other one of said two differential amplifiers measures the currents passing through the said bifilar winding pairs.

6. The apparatus defined in claim 2 wherein the said operational amplifier connected to the outputs of the said two differential amplifiers combines induced voltages on the said bifilar windings of the said stepping motor with applied voltages across and currents through the said bifilar windings.

7. In combination with an electrical stepping motor having at least two bifilar winding pairs, means for determining speed and position values of said stepping motor comprising:
    two differential amplifiers for receiving induced voltages within the said bifilar windings of the said stepping motor in addition to applied voltages across and currents through the said bifilar windings;
    an operational amplifier for combining the outputs of the said two differential amplifiers and for providing an output voltage which corresponds to the said induced voltages of said stepping motor;
    a peak-value rectifier connected to the output of said operational amplifier and responsive to said induced voltages for providing an output signal proportional to the instantaneous speed value of the said stepping motor, and
    a zero detector for determining the position of said stepping motor by comparing the output voltage of said operational amplifier with a reference potential.

8. In combination with an electrical stepping motor having at least two bifilar winding pairs, means for determining speed and position values of said stepping motor comprising:
    two differential amplifiers joined to said bifilar winding pairs for receiving current and voltage values from said stepping motor, with one of said two differential amplifiers measuring the voltages across the said bifilar winding pairs, and the other one of said two differential amplifiers measuring the currents passing through the said bifilar winding pairs;
    an operational amplifier connected to the outputs of said two differential amplifiers for combining induced voltages on the said bifilar windings of the said stepping motor with applied voltages across and currents through the said bifilar windings and for providing an output voltage which corresponds to the said induced voltages of said stepping motor;
    peak-value rectifier connected to the output of said operational amplifier and responsive to said induced voltages for providing an output signal proportional to the instantaneous speed values of the said stepping motor, and
    a zero-detector connected to the output of said operational amplifier and responsive to said induced voltages for providing an output signal indicative of the position of the said stepping motor.

* * * * *